R. H. Cole.

Nut Machine.

N° 17,197. Patented May 5, 1857.

UNITED STATES PATENT OFFICE.

R. H. COLE, OF ST. LOUIS, MISSOURI.

NUT-MACHINE.

Specification of Letters Patent No. 17,197, dated May 5, 1857.

*To all whom it may concern:*

Figure 1:
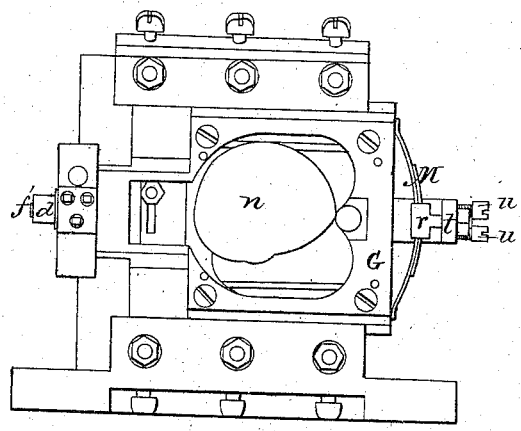
Figure 7:
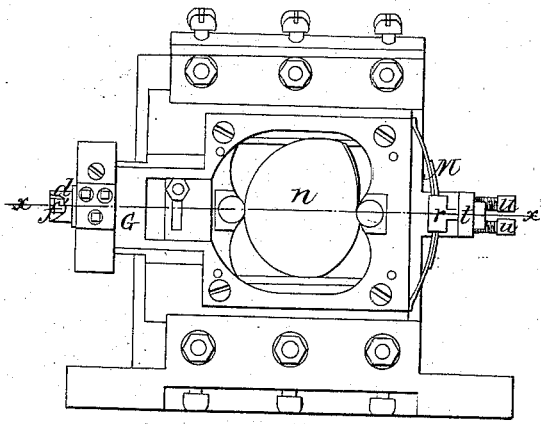
Figure 4:
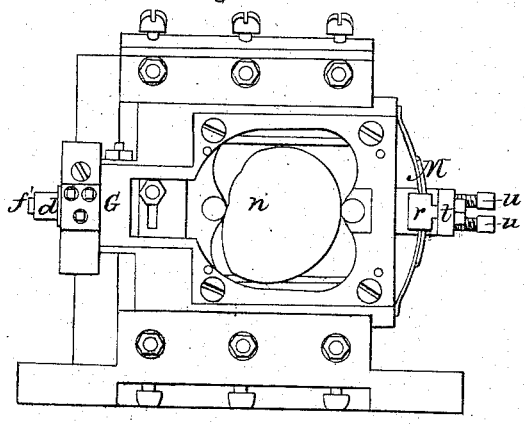
Figure 10:
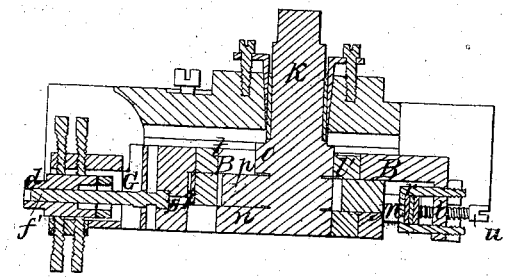
Figure 2:
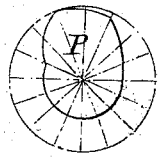
Figure 8:
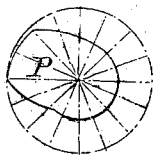
Figure 5:
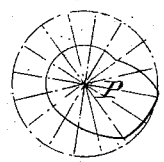
Figure 3:
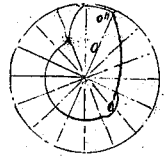
Figure 9:
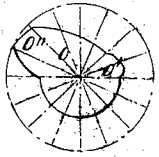
Figure 6:
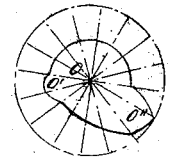

Be it known that I, RICHARD H. COLE, of St. Louis, in the State of Missouri, have invented a new and useful Improvement in Machines Used in the Manufacture of Metallic Nuts; and I do hereby declare that the following is a full and exact description thereof, reference being had to the accompanying drawings, making part of this specification, Figure 1 being a view of that portion of the machine to which my improvement belongs and showing the relative positions of the punches at the moment when the machine commences to make a nut; Figs. 2 and 3, views showing the positions of the cams which actuate the punches when said punches are in the positions shown in Fig. 1; Fig. 4, view showing the positions of the punches when the round punch is driven forward to clear the wad from the angular punch; Figs. 5 and 6, views showing the positions of their cams when the punches are in the positions shown in Fig. 4; Fig. 7, view showing the positions of the punches when the round punch recedes to allow its antagonist to advance immediately after the nut is formed; Figs. 8 and 9, views showing the positions of their cams when the punches are in the positions shown in Fig. 7; Fig. 10, section in the line *x x*, Fig. 7.

Like letters designate corresponding parts in all the figures.

The construction, and operation of the machine is substantially the same as that for which Letters Patent of the United States were granted to me, bearing date the 3rd day of June, 1856, and numbered 15,001. I shall therefore refer to the specification accompanying said Letters Patent for the general description of the machine.

The nature of the present improvement consists in the employment of a spring M, mounted on the plate B, which carries the round punch *f'*, so as to press against the plate G, which carries the angular punch *d*; for the purpose of quickly bringing back the round punch, both when its cam *o*, allows it to recede, after its forward motion for discharging the wad from the angular punch, and also after it punches the hole in the nut in conjunction with its antagonistic round punch, in order to allow said antagonist to advance and clear the wad from the nut. And not only does it cause the punch plate to recede in constant contact with its cam *o*, but thereby causes all the cams to work smoothly without shock, or concussion. Said spring, is mounted in a stirrup *r*, which is secured to an arm *t*, extending at right angles from the sliding plate B of the round punch.

Screws *u u* serve to tighten and adjust the spring in its place. It presses against the sliding plate G, which carries the angular punch *d*, with sufficient force and extent of spring to draw back the round punch whenever the cam *o*, ceases to act upon the sliding plate B, separately. This takes place twice in the act of making a nut; once immediately after the round punch is driven forward to discharge the wad from the angular punch, as shown in Figs. 4, 5, and 6; and again when the round punch recedes, to allow its antagonist to drive the wad out of the nut, as exhibited in Figs. 7, 8, 9, and 10.

The relative positions and motions of the cams and punches, are clearly exemplified in the various figures of the drawings, and require no further description.

What I claim as my invention, and desire to secure by Letters Patent is—

The application of the spring M, to the sliding punch-plates, substantially in the manner and for the purposes herein described.

The above specification of my improvement in machines used in the manufacture of metallic nuts signed this 20th day of August 1856.

R. H. COLE.

Witnesses:
JOHN D. MOUNT,
SANFORD B. KELLOGG.